June 14, 1960   J. S. KAHR ET AL   2,940,431
INTERNAL COMBUSTION ENGINE AND CONTROL SYSTEM
Filed Feb. 14, 1958   6 Sheets-Sheet 5 fig.8.

INVENTOR.
JOHN S. KAHR
BY HAROLD G. HOLLER
Parker and Carter
ATTORNEYS.

Fig. 14.

12,940,431
Patented June 14, 1960

2,940,431

INTERNAL COMBUSTION ENGINE AND CONTROL SYSTEM

John S. Kahr, Greendale, and Harold G. Holler, Hales Corners, Wis., assignors to Nordberg Manufacturing Company, Milwaukee, Wis., a corporation of Wisconsin Filed Feb. 14, 1958, Ser. No. 715,367

18 Claims. (Cl. 123—41)

This invention is in the field of internal combustion engines and control system and is more specifically concerned with a reversing engine, for example for ship propulsion or the like, although many of the inventive aspects are not necessarily restricted thereto, for example in non-reversing engines such as locomotive propulsion.

A primary object of the invention is a new and improved engine with a simplified control.

Another object is an engine with variable valve timing that, by its simplicity, eliminates previous difficulties, for example lash adjuster problems.

Another object is a new and improved V-engine.

Another object is a V-engine with its cylinders longitudinally staggered.

Another object is an engine with an improved variable valve timing actuating mechanism.

Another object is an improved camshaft mechanism for an engine.

Another object is an engine cylinder, cylinder head and camshaft arrangement which substantially reduces the overall engine length.

Another object is a reversing engine with a variable valve timing mechanism which substantially improves performance when going in either direction.

Another object is an engine of the above type which may be either a diesel, dual fuel or a gas engine.

Another object is a concentrated or simplified camshaft mechanism for a V-engine.

Another object is a variable valve timing mechanism usable on either two cycle or four cycle engines.

Another object is a camshaft mechanism which may be used to improve scavenging in a four cycle engine.

Another object is a valve timing and operating mechanism which may be used to reduce the thermal loads on an engine.

Another object is an improved valve actuating and reversing mechanism for a reversing engine.

Another object is an improved double camshaft mechanism.

Another object is a planetary gear drive for a camshaft structure for accurate valve timing adjustment.

Other objects will appear from time to time in the ensuing specification and drawings in which.

Figure 1:
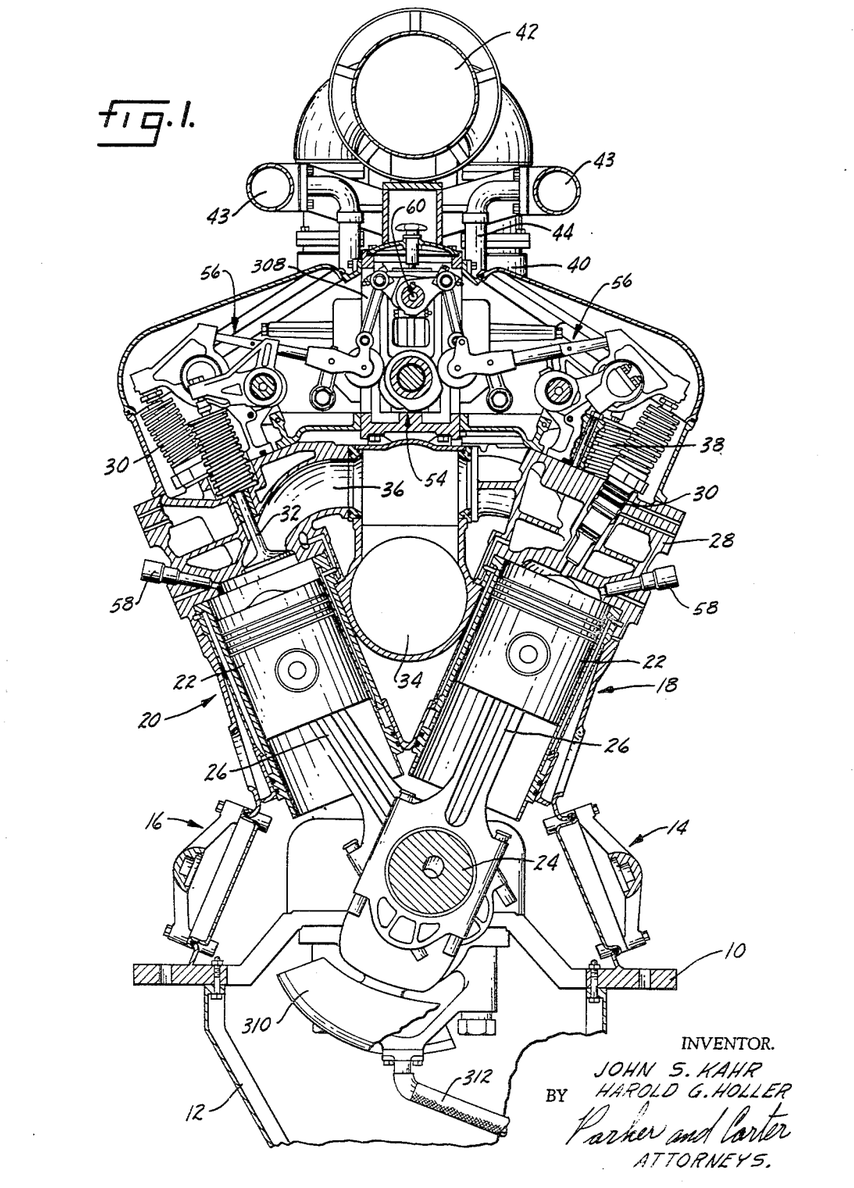
Figure 1 is a lateral section through the engine, taken along line 1—1 of Figure 2.
Figure 2:
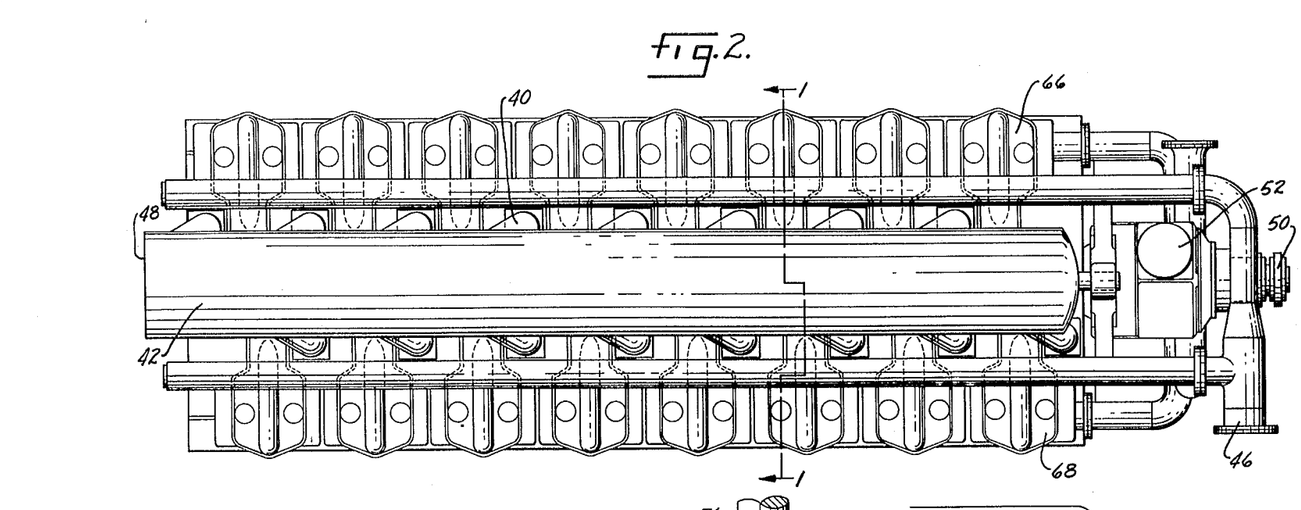
Figure 2 is a top plan view of the engine, on a reduced scale.

Referring first to Figures 1 and 2 for the over-all arrangement, the engine is shown with two rows of cylinders arranged in a V. We have shown a four cycle engine for purposes of illustration although many of the inventive features are not necessarily restricted thereto. In Figure 1 the frame is indicated generally at 10 with a conventional oil pan 12. Suitable inspection ports having the usual covers, strongbacks and sealing rings may be provided at each side at 14 and 16. Two rows or banks of cylinders at 18 and 20, with the usual cylinder liners, water jackets and so forth, may be carried by the frame and disposed at a suitable angle to form a V, as shown in Figure 1. Each such cylinder carries a piston 22 of a suitable type which is connected to the crankshaft 24 through a suitable connecting rod 26. The details of the crankshaft, connecting rod, connecting rod bearings, oil passages in the connecting rod, the wrist pin bearings, rings for the piston, piston structure and cooling arrangement, etc., are not important to this invention and will not be set forth in detail. Since the cylinders, cylinder heads, valves, actuating mechanism, etc. for each bank of cylinders may be the same, the same reference numerals will be used, except as set forth hereinafter.

Each cylinder has a suitable cylinder head 28 which carries various valve elements or devices, such as a suitable fuel injector 30 which is shown as a unit injector, and inlet valves 32. A suitable inlet manifold 34 may be disposed in the V between the cylinder banks to supply air to inlet passages 36 leading to the inlet valves. Suitable exhaust valves, designated generally at 38 in Figure 1, exhaust products of combustion to exhaust nozzles or branch pipes 40 and to the exhaust manifold 42 suitably disposed on top of the engine. Suitable cooling water outlet manifolds or mains 43 may be mounted on top of the engine having pipes 44 running to the cooling water jackets. A suitable outlet connection 46, in Figure 2, may be provided at either end.

One or more exhaust driven superchargers or the like may be connected to one end, as at 48, of the exhaust manifold, or at both ends, but for clarity we have omitted it from the drawings. Or a crankshaft driven compressor in certain instances might be used. The point is that a supercharger, while desirable in particular situations, is not essential in all. When a supercharger is used, we prefer that the compressed air from the supercharger be first cooled by a suitable intercooler and then supplied to the inlet manifold 34. In Figure 2 a suitable air distributor assembly has been indicated at 50 and a reversing gear actuator assembly at 52.

In Figure 1 a camshaft mechanism, indicated generally at 54, is located in the V between the cylinder banks and suitable lever and push rod assemblies 56 extend from each side to the valve elements in the cylinder heads. Hereinafter, on occasion in the specification and also in the claims, the term "valve device" may be used to refer to and should be interpreted to include both inlet and exhaust valves as well as devices for supplying fuel, which in most cases might take the form of a gas valve, a fuel injector, or what have you. The cylinder heads may also be supplied with starting air nozzles or valves 58. Above the camshaft assembly we may position a link shaft 60 to be explained in detail hereinafter.

Figures 3, 4:
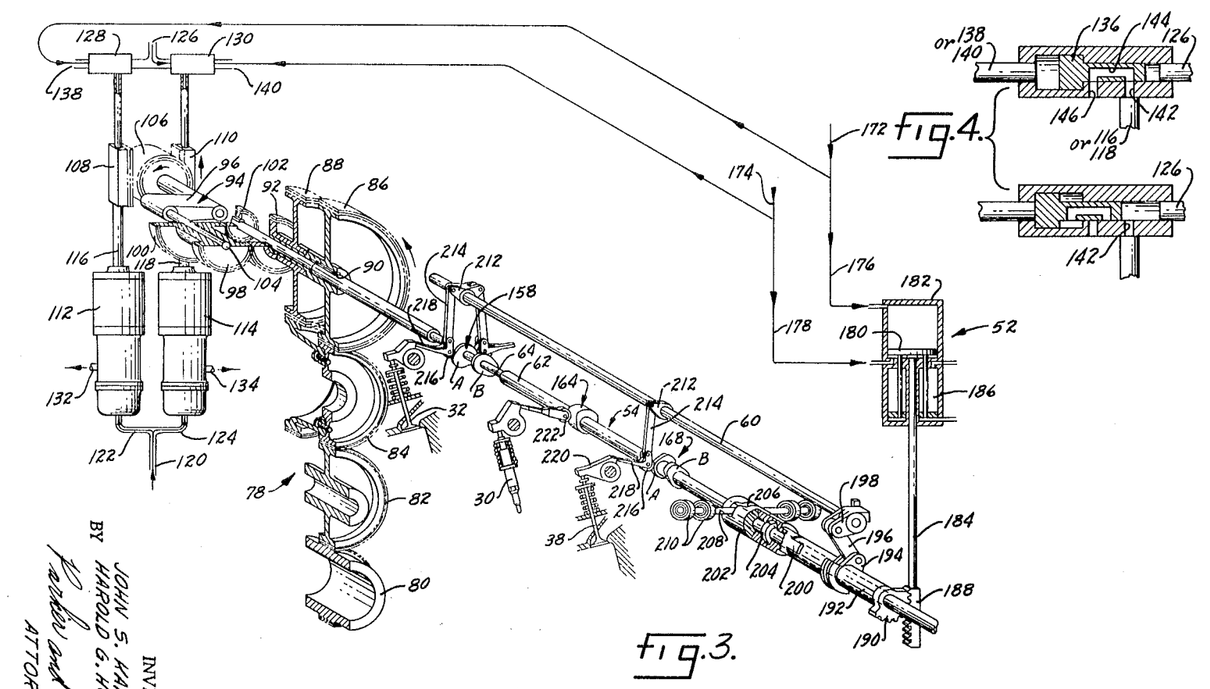
Figure 3 is a diagrammatic perspective of the camshaft, reversing, and valve timing mechanisms.
Figure 4 is a detail of Figure 3, on an enlarged scale.
Figure 5:
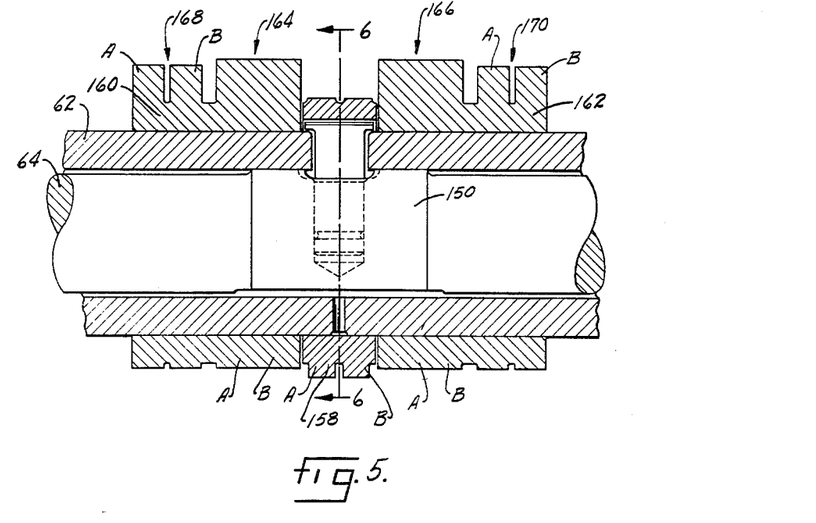
Figure 5 is a partial axial section of a portion of the camshaft mechanism.
Figure 6:
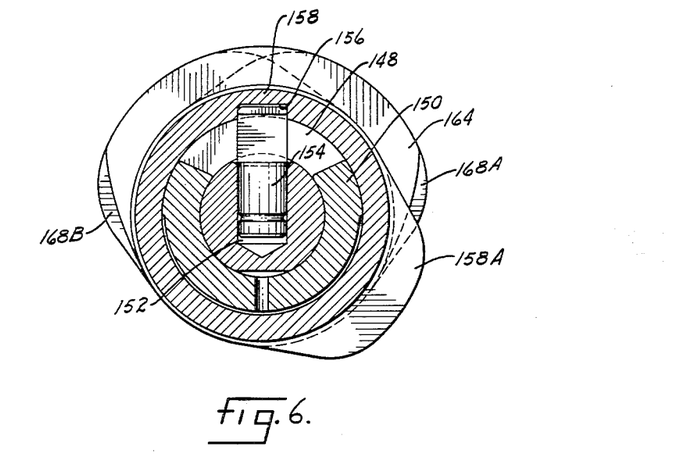
Figure 6 is a section along line 6—6 of Figure 5.
Figure 7:
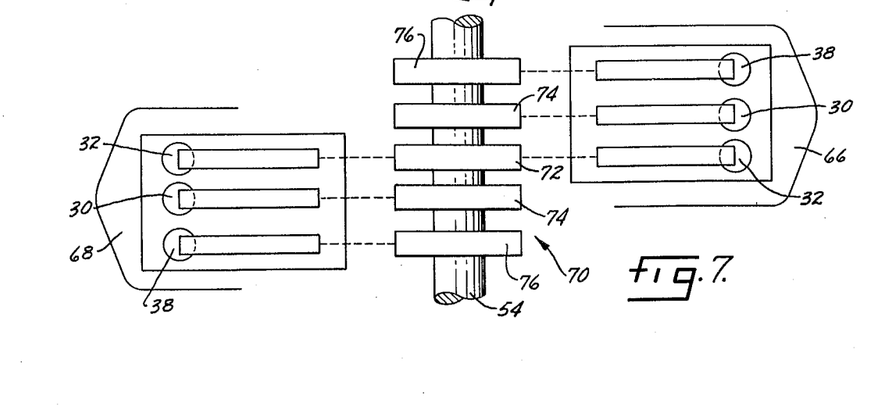
Figure 7 is a schematic view of two cylinder heads and the camshaft mechanism.

As shown schematically in Figure 3 and in detail in Figures 5 and 6, the camshaft mechanism 54 may include an outer camshaft or sleeve 62 and an inner camshaft 64. The various cams for operating the valve devices are positioned in groups or clusters and such a group is shown in Figures 5 and 6. Each such group operates the valve devices in the cylinder heads of two cylinders, one in each bank, which we may refer to on occasion hereinafter as "paired" cylinders. For example, the first cylinder 66 in the left bank, from the top of Figure 2, is paired to the first cylinder 68 in the right bank. The same is true of the second, third, fourth cylinders, and so forth, in each bank. As schematically shown in Figure 7, two such paired cylinder heads have their valve devices operated by a cam group or cluster. We have designated the cylinder heads in Figure 7 as 66 and 68 corresponding to the first cylinder heads in the right and left banks in Figure 2, but this showing should be taken as representative of any set of paired cylinders. The cam group 70 in Figure 7 has a plurality of cams including a central common cam 72, in this case an inlet cam or a cam for operating the inlet valves in the paired cylinder heads, separate fuel cams 74 and separate exhaust cams 76. It should be noted that the cylinder heads of the paired cylinders overlap so that the inlet valves 32 in each are laterally opposite the central or common cam 72. The fuel cams 74 are next to the common inlet cam and on each side of it and are laterally aligned with the fuel injectors 30 or whatever fuel devices are used. The exhaust cams 76 are on the outside of the group on each side and are laterally aligned with the exhaust valves 38.

This arrangement has the unique advantage that the cylinder heads for both banks are identical and we do not face the problem of right and left heads. In other words, all of the cylinder heads are identical and may be used in either row of cylinders. Accordingly, the expense involved in making the right and left hand cylinder heads is avoided.

The camshaft 54 in Figure 7 has been only shown schematically, but it may be in accordance with the multiple camshaft mentioned hereinabove and explained in detail hereinbelow. We have not gone into detail in Figure 7 on the push rods and lever assemblies since this will be set forth in detail hereinafter, where significant.

The crankshaft 24, as shown in Figure 1, drives the camshaft mechanism through a suitable drive 78, in Figure 3, that may include a crankshaft gear 80 which may be mounted on the crankshaft. A suitable idler 82 drives a divided gear 84 which, through its two portions, drives two camshaft gears 86 and 88. In effect, the drive to the camshaft mechanism splits or is divided. One of the camshaft gears 86 is suitably keyed as at 90 to the outer camshaft 62 so that the outer camshaft is driven directly by the crankshaft. The gearing should be such that a 1-1 ratio is set up if the engine is a two cycle engine or a 2-1 ratio if a four cycle engine. The other camshaft gear 88 has a pinion 92 on its hub which drives the inner cam shaft 64 through a planetary mechanism indicated generally at 94.

As shown in Figure 3 the planetary mechanism may include a cage 96 carrying a first pinion 98 in mesh with the pinion 92 of the camshaft gear and driving a second pinion 100 mounted or carried on its hub. The second pinion 100 drives a third pinion 102 which may be suitably keyed or otherwise connected to the inner camshaft 64. The first and second pinions 98 and 100 of the planetary mechanism are rotatably mounted on an axle or a shaft 104 carried by the cage. The gearing is such that the inner and outer camshafts will be driven at the same speed. However, the phase angle between them might be varied by rotating the cage 96 with the hereinafter described mechanism.

For example, we have shown a gear 106 on the cage which meshes with two racks 108 and 110, one on each side. Each rack is connected to an actuator, such as at 112 and 114, through a piston rod, 116 and 118. One of the actuators is energized, in a manner to be explained hereinafter, while the other is de-energized or inactive while the engine is going in one direction. But when the engine is reversed, the actuators are also reversed, meaning that the previously active actuator is de-energized and the previously inactive actuator is energized. Assume for the moment that when the engine is going forward, the actuator 112 is energized and the actuator 114 is de-energized. This means that actuator 112, in response to a variable engine factor, for example load, in a manner to be set forth hereinafter, moves the piston rod 116 and rack 108 to the desired position. This rotates the cage which varies the phase angle between the inner and outer camshafts. As set forth hereinafter, the inner camshaft carries cams of one type, for example the inlet cams, while the outer camshaft carries cams of another type, for example the exhaust and fuel cams. But this might be varied.

Assuming that the engine has an exhaust driven supercharger, we supply the pressure of the air from the exhaust driven supercharger in the inlet manifold to the actuators through a suitable connection or pipe 120 which splits into branches 122 and 124 so that the outlet pressure from the exhaust driven supercharger will be supplied to each actuator. It will be understood that the outlet pressure from an exhaust driven supercharger is indicative of the load on the engine, meaning that the higher loads cause a higher pressure from the supercharger while the lower loads cause a corresponding lower pressure. While we find it convenient to control the actuators in accordance with the pressure of the air in the inlet manifold since it is indicative of load, there are other factors on an engine which are also indicative of load. For example, the pressure in the exhaust manifold. However, we prefer to use the inlet manifold pressure if an exhaust driven supercharger or turbocharger is being used since it is more accurate and sensitive.

The details of the particular actuators 112 and 114 are well known, for example see U.S. Patent No. 2,780,912, issued February 12, 1957, or U.S. Patent No. 2,785,667, issued March 19, 1957. As shown in those prior patents, relatively high pressure oil is supplied to each actuator and through a multiple piston arrangement the pressure of the oil is used to move the piston rod, in this case the rods 116 and 118. In Figure 3 the source of oil is indicated at 126 which splits into separate branches with each branch passing through a control valve, as at 128 and 130, to and through the piston rods which extend above the racks 108 and 110. The piston rods are shown as hollow and the pressure of the oil may be supplied down either rod. It will be understood that the oil is supplied through either one rod or the other, but not both, and the control for the selection thereof is determined by the valves 128 and 130 which will be explained in detail hereinafter. Each actuator is provided with a suitable drain 132 and 134 for oil.

As is shown in the prior above mentioned patents, the pressure of the air from the turbocharger is taken from the inlet manifold through a suitable connection, as at 120 in Figure 3 in this case, and supplied to the actuators. This air pressure controls a master piston in the actuators which in turn controls a servant or slave piston by regulating the amount of pressure oil, from the source 126, that is supplied to the power or servant piston which moves the rods 116 or 118. The greater the inlet air pressure in 120, the more pressure oil is admitted and the more the rack 108 or 110 is moved, and vice versa.

In any event, one of the two actuators controls the position of the cage 96 to set the phase angle between the cams on the inner and outer camshafts. We have shown the two positions of each control valve in Figure 4 and it should be understood that the control valve shown in Figure 4 may be either control valve 128 or 130. Each control valve contains a piston 136 which is movable between the two positions shown. As will be explained in detail hereinafter, the reversing mechanism, as at 52 in Figure 2, is actuated by an air supply and this air supply is connected to each control valve through a suitable pipe 138 or 140. It should be understood that the air from the reversing system will be supplied to the control valves through either pipe 138 or 140 but not both at the same time.

When the air is supplied the piston 136 will be moved, to the right in Figure 4, so that it closes the port 142 between the oil supply 126 and the piston rod, 116 or 118. But when the air supply is removed the oil pressure from 126 will force the piston to the left in Figure 4, thereby opening the discharge passage 142 to the piston rod. It will thus be seen that when air is supplied through one of the pipes, it moves one valve to close the discharge port 142 so that the particular actuator associated with that control valve will be de-energized. And the other actuator will be energized since the piston in the other control valve remains in a withdrawn position allowing oil pressure to communicate with its actuator mechanism. It should also be noted that each of the pistons 136 has a bypass 144 which will line up with the discharge 142 and an overflow port 146 so that when the oil pressure supply is blocked to a particular actuator, the oil that would otherwise be trapped in the de-energized actuator may be vented through the discharge 146. It should be noted that both piston rods move, one up, the other down, even though only one actuator at a time is energized since the racks 108 and 110 both are in mesh with the pinion or gear 106.

In Figures 5 and 6 we have shown the details of the cam group which, as stated hereinabove, may be considered to operate the valve devices for any of the paired cylinders. In these figures the inner camshaft 64 is shown inside the outer camshaft 62 and at a suitable location the outer camshaft or sleeve is slotted at 148 through a suitable arcuate extent, shown in Figure 6 as on the order of 100 degrees. The inner camshaft has a suitable upper bearing area 150 which bears against the outer camshaft or sleeve on both sides of the slot 148, as shown in Figure 5. The inner camshaft has a suitable hole or channel 152 in such bearing area with a pin or key 154 disposed therein projecting upwardly into a notch or slot 156 suitably formed in the underside of a ring 158 which straddles the arcuate slot 148, as shown in Figure 5, and rides on the outer camshaft. Such ring is a cam and may be considered the common cam or inlet cam, such as at 72 in Figure 7. Thus, rotation of the inner camshaft 64 within the outer camshaft or sleeve 62 will cause the ring or cam 158 to rotate on the sleeve 62 through the pin or key 154.

On each side of the ring or common cam 158, we provide additional cam rings or sleeves on the outer camshaft, as at 160 and 162. Each such ring or sleeve may include an inner portion, as at 164 and 166, respectively, which, in accordance with the Figure 7 arrangement, would be the cams for actuating the fuel elements and outer portions 168 and 170 for actuating the exhaust valves. Each of the sleeves is either shrunk, press fitted, or otherwise suitably held on the outer camshaft. Although a key might be used, we prefer to avoid a key since this would require notching the outer camshaft and, accordingly, weakening it.

As will be explained hereinafter, the engine may be a reversing engine in which case, when the engine is reversed, the camshaft mechanism is shifted axially a predetermined amount by a mechanism, to be explained in detail hereinafter, to bring different cams into alignment with the respective cam followers. Shifting the camshaft in reversing engines is well known. For this purpose, each of the cam elements in Figure 5 is divided into two portions, one for ahead operation and the other for astern. For example, each of the exhaust cams 168 and 170 has two portions A and B, the A portion being for the ahead operation and the B portion for astern. The inlet cam 158 also has separate A and B portions, A for ahead and B for astern, with the same spacing. The fuel cams 164 and 166 have A and B portions also; however, they may be identical since it is the lift or descent portion of a fuel cam in a diesel engine which determines the timing of fuel injection but not the quantity. Thus, the fuel cam may be symmetrical so that it will operate properly in either direction. However, in a gas engine or dual fuel engine, this might be varied and we have only shown it in Figures 5 and 6 applicable to a diesel engine for illustrative purposes. The particular shape or configuration of the cams is not in and of itself important and this showing should not be taken as essential to the invention.

Each such cam group or cluster on the camshaft mechanism may be considered to be in accordance with Figures 5 and 6. For purposes of illustration, in Figure 3, we have shown only one set of inlet cams 158A and B for ahead and astern operation, one broad fuel cam 164, which may be considered to have portions A and B although they are not so designated on Figure 3, and a pair of exhaust cams 168A and B. Since the A portions of the cams may be considered to be ahead cams, in Figure 3 those portions bear against the follower rollers and, accordingly, the engine may be considered to be going ahead.

In the example given hereinabove where the actuators 112 and 114 in Figure 3 selectively control the cage of the planetary mechanism to vary the angular position of the inner camshaft relative to the outer camshaft, the inlet cams will be varied in relation to the cyclical operation of the engine. Accordingly, the timing of the inlet valves will be varied in accordance with the phase of the inlet cam as controlled by one of the actuators which, as explained hereinabove, responds to load. Since the exhaust and fuel cams are mounted on the outer camshaft which is geared directly through the drive 78 in Figure 3 to the crankshaft, the timing of the exhaust valves and the fuel injectors will be constant. However, this is only given as an example. For example, we might reverse the inlet and exhaust cams, although we prefer that the exhaust cams be on the outer camshaft since they carry a heavier load. On the other hand, if it is desired to variably time the exhaust valves, such a switch could be made with few unimportant design changes.

The reversing mechanism 52 for shifting the camshaft axially during reversing, as shown in Figure 3, and, as set forth briefly with relation to the operation of the control valves 128 and 130, involves the use of pressure air. For example, at 172 and 174 we indicate sources of "ahead" and "astern" air, respectively, which may be supplied through a suitable relay air valve, not shown, which may be conventional. Any suitable fluid could be used, but air is conventional. Through suitable lines 176 and 178, this air is carried to opposite sides of a reversing piston 180 in an air cylinder 182. The piston rod 184 of the piston passes through a suitable dash pot 186 which, in and of itself, is not important to the invention. A suitable reversing rack 188 is shown as carried by the piston rod in mesh with a gear segment 190 carried on a sleeve 192 having at a suitable location a single or double lever 194 pivoted to a link 196 which is in turn pivoted to a single or double lever 198 on the link shaft 60. The sleeve 192 might be rotatably connected by a slip joint 200 to a reversing cam 202 so that rotation of the sleeve will cause rotation of the cam but will allow the cam to move axially. The cam 202 is connected to the inner camshaft 64 by a suitable thrust shoe 204 on the inner camshaft which projects into a corresponding channel or slot inside the cam so that cam and camshaft are rotatably free but axially interlocked. The cam 202 has a suitably shaped cam groove 206 into which camming bars 208 project from each side carried by suitable bearing units 210. While we have shown two such camming bars, only one is necessary.

The link shaft 60 has suitable levers 212, either single or double, connected by suitable links 214 to the follower rollers 216 which bear against the various cams. Suitable push rods 218 are connected between the follower rollers and the levers 220 which actuate the various valve devices.

As shown in Figure 3 when the piston 180 of the reversing mechanism is actuated to move the rack 188, thereby rotating the sleeve 192, the cam 202 will also be rotated and at a predetermined time in such rotation the cam and the camshafts will be shifted axially. Rotation of the sleeve 192 also rotates the link shaft 60 which through the links 214 either raise or lower the followers 216 to throw them off of the various cams. This is true of both the inlet and exhaust valves shown. However, it is not true of the follower roller 222 for the fuel injector 30 since the fuel cam 164 is a broad cam and the follower roller will merely slide along it when the camshafts are shifted. The cam groove 206 and the various linkages are so designed that all of the necessary followers will be thrown off of the cams when an axial movement of the camshaft takes place. After the camshafts are fully shifted, further rotation of the sleeve 192 takes the link 196 over center and the follower rollers are returned to the cams.

In Figure 3 we have only shown one inlet valve, one exhaust valve and one fuel device with their associated cams which are quite widely spread. However, the cams would actually be more in accordance with Figures 5 and 6 and the arrangement in Figure 3 is schematic for purposes of illustration.

We have not shown the various starting air valve interlocks between the starting gear and the camshaft, the various dampers, etc., in Figure 3, since they are not considered important to the invention and may be conventional.

Figure 12:
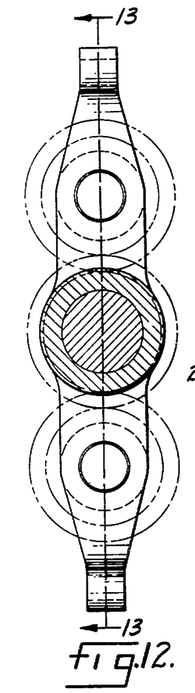
Figure 12 is a variant form of planetary mechanism, in section, taken along line 12—12 of Figure 13.
Figure 13:
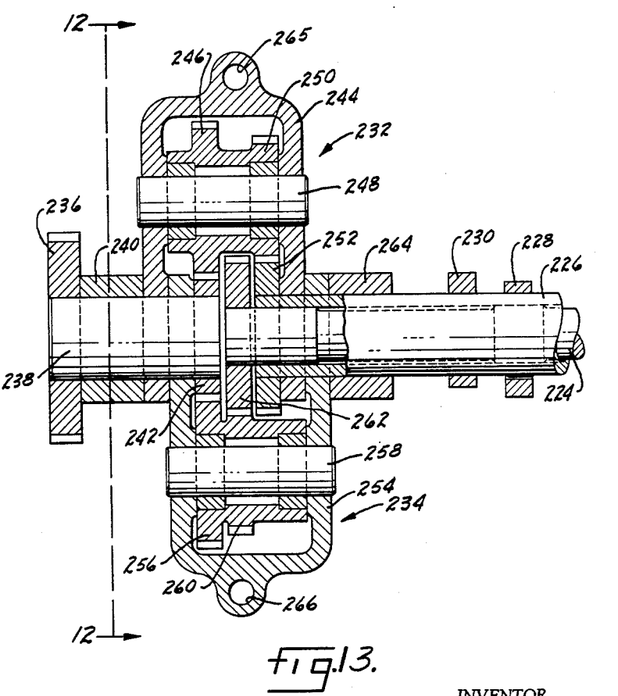
Figure 13 is a section taken along line 13—13 of Figure 12.

In the specific examples given above, the planetary mechanism was used to vary the timing or phase of the inlet cams relative to the exhaust cams or crankshaft. However, in certain installations it might be desirable to vary the phase of both the inner and outer camshafts in some desired relationship to the cyclical operation of the engine, possibly together or at different times or overlapping. In Figures 12 and 13, we have shown a variation in which the inner and outer camshafts are indicated at 224 and 226, respectively. The inlet cam 228 may be connected to the inner camshaft 224 by an arrangement such as in Figures 5 and 6. Two planetary mechanisms are used, one, indicated generally at 232, for the outer camshaft, and, the other, indicated generally at 234, for the inner camshaft. The drive from the crankshaft could be assumed to come in on a pinion 236 which might be mounted on a suitable stub shaft 238 carried in a suitable bearing 240. A suitable pinion 242 might be carried at the other end of the stub shaft.

The cage 244 for the outer camshaft's planetary mechanism might carry a suitable pinion 246 on a shaft 248 in mesh with the pinion 242 and having on the same sleeve a second pinion 250 in mesh with a gear 252 mounted on the outer camshaft. The cage 254 for the inner camshaft's planetary mechanism might carry a pinion 256 on a shaft 258 having a smaller pinion 260 on the same hub. The larger pinion 256 is shown in mesh with the driving pinion 242 and the smaller pinion 260 is in mesh with a gear 262 on the inner camshaft 224. Suitable bearings 264 could be used to support the double camshafts.

In conformity with the suggestion set forth hereinabove of having the inlet cams on the inner camshaft and the exhaust cams on the outer camshaft, rotation of the planetary mechanism 232 would vary the phase of the exhaust cams relative to the crankshaft to vary the timing of the exhaust valves, while movement of the planetary mechanism 234 would vary the phase of the inlet cams relative to the crankshaft and would, therefore, vary the timing of the inlet valves.

Each of the planetary mechanisms 232 and 234 in Figures 12 and 13 would be provided with two actuators, connected at, say, 265 and 266, either the same as or similar to the ones indicated at 112 and 114 in Figure 3 so that when the engine was running ahead, one such actuator would move each planetary mechanism and another such actuator would move each when running astern. The same type of control valves could be used as at 128 and 130 in Figure 3.

Figure 14:
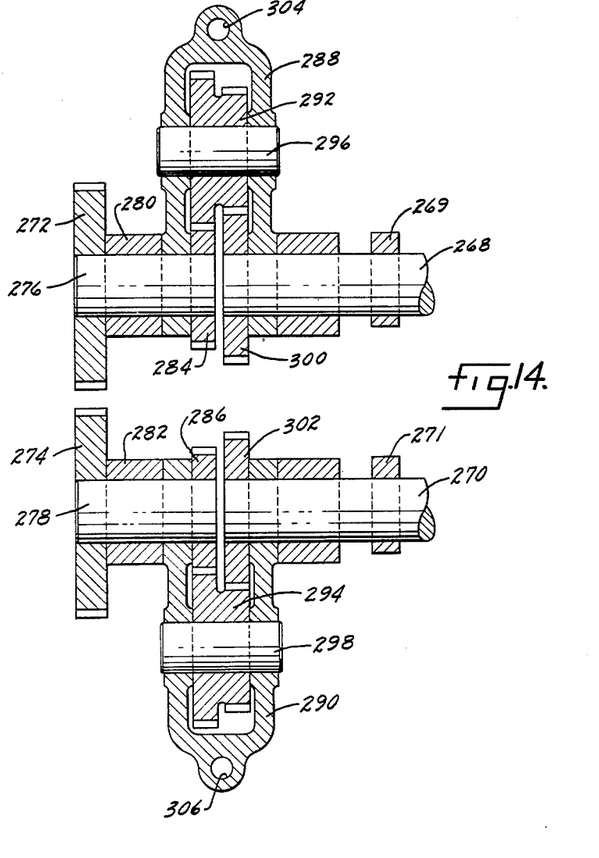
Figure 14 is a variation of Figure 13.

In Figure 14 we have shown a variation of the planetary mechanism shown in Figures 12 and 13 in which separate camshafts 268 and 270 might be used, 268 being, for purposes of illustration, considered the exhaust camshaft and having an exhaust cam 269, and 270 the inlet camshaft with a suitable inlet cam 271. In this case the drive for each camshaft would come up to separate gears 272 and 274 mounted on stub shafts 276 and 278 held in suitable bearings 280 and 282 or the like having pinions 284 and 286 inside of cages 288 and 290 and in mesh with one of a double gear arrangement 292 and 294 mounted on a suitable axle or shaft 296 and 298 with the smaller gear of the double gearing in mesh with suitable gears 300 and 302 on the exhaust and inlet camshafts. As in the Figures 11 and 12 embodiment, double actuators could be used for each cage connected at a suitable point as at 304 and 306.

The point is that in the form shown in both Figures 13 and 14, the planetary mechanism may be suitably operated so that the timing of both the inlet and exhaust valves may be varied. One possible operation or engine cycle that might be carried out by the use of this mechanism is illustrated in the valve timing diagram in Figures 8 and 9 which is set up for a four cycle engine, preferably of the diesel or dual fuel type. At no load and during starting, the inlet valve is constructed to close in Figure 8 at $a$ during the suction stroke of the piston and open at $b$ during the exhaust stroke. The exhaust valve during such no load operation closes at $c$ during the suction stroke and opens at $d$ during the expansion stroke. At the higher loads, the actuating mechanism varies the planetary mechanism to change the timing so that the following might occur. The time of closing of the inlet valve is advanced from $a$ to $e$ to provide a substantially shorter effective compression stroke and the time of opening of the inlet valve is advanced from $b$ to $f$. At the same time, the time of closing of the exhaust valve is retarded from $c$ to $g$ while the time of opening of the exhaust valve is retarded from $d$ to $h$. At light loads in a four cycle engine reverse scavenging might occur with large valve overlap due to the pressure in the exhaust manifold being higher than the pressure in the inlet manifold. But in the above operation the valve overlap is substantially reduced at light loads and only exists from $b$ to $c$ which is negligible. At the heavier loads and at full load the valve overlap is substantially increased and exists from $f$ to $g$ where substantial scavenging and cooling of the cylinder head and piston will occur since the pressure in the inlet manifold will be substantially higher than the pressure in the exhaust manifold. At the same time, at no load and the light loads and also during starting, the inlet valve will be closed at $a$ providing a long effective compression stroke to fire the fuel, but at the higher loads, and particularly at full load, the point of closing of the inlet valve will have been advanced to $e$ thereby providing a much shorter effective compression stroke to thereby substantially reduce the final compression temperature.

For an example of such operation, reference is made to U.S. Patent No. 2,670,595.

Figure 8:
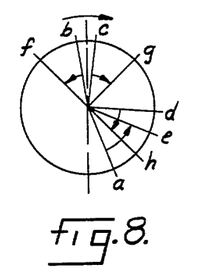
Figure 8 is a proposed valve timing diagram for a four cycle engine.

At the lighter loads, the exhaust valve opens early as at *d*, which, while it provides a short expansion stroke, nevertheless, exhausts additional energy from the cylinders to the exhaust driven turbocharger. The energy subtracted from the crankshaft may be made up by supplying additional fuel to the cylinders over and above what is normally supplied. At the higher loads and at full load, however, the time of opening of the exhaust valve is retarded from *d* to *h* so that a full expansion or power stroke is acquired and the energy for the turbocharger is sufficient to drive it without the extra fuel amount mentioned above for light loads. For example, reference is made to U.S. Patent No. 2,820,339 for the importance and advantages of such a system of operation.

Figure 9:
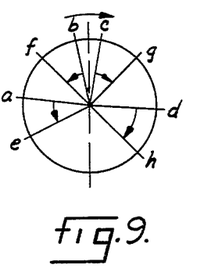
Figure 9 is a variation of Figure 8.

The Figure 8 arrangement is specifically intended for a diesel or dual fuel engine. In Figure 9 we have shown a possible arrangement for a gas engine which is ignited by an electric spark. At no load, the inlet valve is closed at *a* during the compression stroke and opened at *b* during the exhaust stroke. The exhaust valve is closed at *c* during the suction stroke and opened at *d* during the power stroke. Thus, there is very little valve overlap between *b* and *c* at the light loads so that there will not be reverse scavenging and the expansion stroke is quite short so that additional energy may be exhausted to the turbocharger to sustain it. At the same time, the effective compression stroke from *a* to top dead center is quite short and the time of closing of the inlet valve is such that the weight of air entrapped is in direct proportion to the amount of fuel supplied to provide the proper air-fuel ratio for the mixture in the cylinder.

However, at higher loads and particularly at full load, the time of closing of the inlet valve is advanced from *a* to *e* while the time of opening of the inlet valve is correspondingly advanced from *b* to *f*. The time of closing of the exhaust valve is retarded from *c* to *g* while the time of opening of the exhaust valve is retarded from *d* to *h*.

In Figure 9 it should be noted that about the same advantages are derived as set forth with reference to Figure 8. At light load, there is very little valve overlap, only from *b* to *c*. Accordingly, reverse scavenging cannot take place. But at the heavier loads and particularly at full load, substantial valve overlap exists, from *f* to *g*, so that good scavenging will occur. At light loads, the exhaust valve opens during the expansion stroke at *d* so that energy will be exhausted from the cylinder to the supercharger to sustain it, while at the heavier loads and full load the exhaust valve opens at *h* so that not as much energy is subtracted from the crankshaft as it is no longer needed by the supercharger. The inlet valve closing varies between *a* and *e* and the effective compression stroke is substantially reduced so that thermal and mechanical loads on the engine will be substantially less. In all cases, the inlet valve is closed so as to entrap a weight of air which is directly proportional to the quantity of fuel supplied at any particular load so that the resulting mixture in the cylinder will have an approximately constant air-fuel ratio at all loads. For a further example of such operation, reference is made to U.S. Patent No. 2,773,490, issued December 11, 1956.

In all of the examples given above, we have referred to and shown a four-cycle engine specifically, but it should be noted that various phases of the invention may also be practiced on two-cycle engines. For example, we have shown a two-cycle valve timing diagram in Figures 10 and 11. It will, of course, be understood that the planetary mechanism may be used to vary the phase angle of the camshaft to thereby vary the timing of the exhaust valve in the cylinder head of a uniflow two-cycle engine having inlet ports around the wall of the cylinder. Or it might be used to vary the timing of an inlet valve in the cylinder head of a uniflow two-cycle engine with exhaust ports around the wall of the cylinder. Or it might be a loop scavenged engine having a compression control valve in the cylinder head, such as in accordance with copending U.S. application Serial No. 496,519 filed March 24, 1955 in the name of Hans U. Lieberherr. For example, in Figure 10 the opening and closing of the ports around the cylinder wall, be they inlet or exhaust ports, are indicated at *i* and *j*, respectively, which of course is fixed. If the engine is a uniflow two-cycle engine with one or more exhaust valves, we might variably control one of them so that at light loads it opens at *k*, thereby providing a short effective expansion stroke but also supplying additional energy for the turbocharger to sustain it. At the heavy loads, the time of closing could be retarded to *l* so that a longer effective power stroke would be obtained and the turbocharger would become self-sustaining. This is only given as an example, however.

Figure 10:
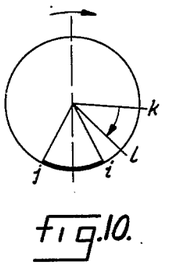
Figure 10 is a proposed valve timing diagram for a two cycle engine.
Figure 11:
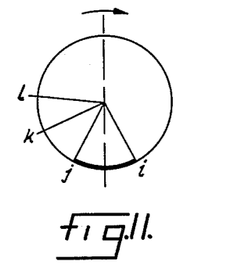
Figure 11 is a variation of Figure 10.

In Figure 11 another arrangement is shown in which the ports around the cylinder wall of a two-cycle engine open and close at *i* and *j*, as before. In this case, assume that a compression control valve is positioned in the cylinder head of a loop scavenged engine and the arrangement is such that between no load and full load, the time of closing of such valve varies between *k* and *l* to provide a short effective compression stroke. Or a combination of Figures 10 and 11 might be used.

In both Figures 10 and 11 the precise opening and closing times are only schematic. In Figure 11, the closing time of the valves at *l* and *k* could be either for no load or full load, depending upon whether the engine is diesel, dual fuel or spark-fired.

The use, operation and function of our invention are as follows:

We have shown a reversing engine, although many of the aspects of the invention are not specifically restricted to a reversing engine. The invention has been primarily described in connection with a four cycle engine. But various aspects of it should be considered with two cycle engines. We have referred mostly to a diesel engine, since most reversing engines are such. However, both dual fuel and spark-fired engines should be considered.

The invention has many advantages. To begin with, the output of the engine is substantially increased over normal engines, but at the same time the over-all structure of the engine is compact. Therefore, the floor space and head room required by the engine is no greater than an engine of substantially less power. This is important in marine and locomotive units.

We find that it is particularly important to have only one style of cylinder head and the staggered arrangement of paired cylinders is important in this respect. The cam groups are intended for each of the paired cylinders and each such cam group has a common cam so that the cylinders are overlapped and staggered. If all of the cylinders were precisely aligned laterally, you would be required to have both right and left hand cylinder heads which involves added expense and, by our invention, is unnecessary.

In connection with a four-cycle engine, where the timing of the inlet valve is varied, such as set forth in connection with Figure 3, two actuators are used to operate the planetary mechanism. But only one is effective at a time, as set forth hereinabove. The point is that when the engine is turning in one direction, one actuator controls the planetary mechanism, but when the engine is going in the other direction, the other actuator controls. In each case the non-controlling actuator is de-energized as set forth above. The advantage of this is that the variation of the inlet valve timing, relative to the direction or rotation of the engine, is always the same. If only one actuator is used, the inlet valve will be advanced when the engine is running in one direction, and retarded when it is running in the other direction. But in this case, the inlet valve will always be variably timed in the same relative direction regardless of the direction of rotation of the engine.

The mechanism for selectively energizing and de-energizing the actuators, as tied in with the reversing mechanism which shifts the camshafts, also has the advantage that it is foolproof and automatically takes place when reversing occurs.

In connection with Figures 5 and 6, we have shown the inlet cam as the common cam but it might be the exhaust cam. We prefer, however, that the inlet cam be connected to the inner camshaft, since it carries less load than the exhaust cam.

We may or may not use double planetary mechanisms to vary the relative timing of both the inlet and exhaust cams, such as set forth in connection with Figures 13 and 14. But in certain situations it may be advantageous to use variable exhaust valve timing as well as variable inlet timing and the Figure 13 arrangement has the advantage of compactness and simplicity.

We have often referred to a marine reversing engine, but non-reversing locomotive as well as other type units should be considered.

The particular planetary arrangement discussed hereinabove should also be considered in connection with the reversing mechanism shown in U.S. Patent No 2,434,647 since the phase angle of the crankshaft in that patent could be varied through a suitable number of degrees to accomplish reversing, by the mechanism shown herein.

Another advantage of the particular planetary mechanism shown is that we use simple spur gears. We do not need bevel or helical gears which, as is well known, are much more expensive and complicated. Also, the load on our simple planetary gearing mechanism is much less than on a differential system, or other such systems since the reaction load cancel instead of adding. Accordingly, the system will respond more quickly and much more accurately, will be more sensitive, and will require a smaller lower power control unit than if a differential or the like is used.

When the engine is a non-reversing engine, for example in a locomotive with a generator drive, the axially shiftable camshaft may not be necessary, however, many of the other features should be considered.

One big advantage of the invention is in a V-engine where the double camshaft mechanism may be snugly housed in the crotch of the V directly below the link shaft mechanism, as shown in Figure 1. It should also be noted that the double camshaft mechanism 54 and link shaft 60 are both included in the camshaft housing, indicated generally at 308. Various other elements, shown in Figure 1, for example the counterweight 310 on the crankshaft, the lubricating oil inlet 312 to a main bearing, etc. are not important to this invention and, accordingly, will not be set forth in detail.

The greatest number of uses of this invention is probably in non-reversing V or in-line engines for pumping stations, power development, locomotive propulsion or what have you, but many of the aspects of the invention fit quite nicely in reversing engines. In this sense, the disclosure and coverage should be considered for either, although we prefer to concentrate on non-reversing engines.

While we have shown and described the preferred form and suggested various modifications of our invention, it should be understood that suitable additional modifications, changes, substitutions and alterations may be made without departing from the invention's fundamental theme. For example, we have not shown either the supercharger, be it an exhaust driven or a crankshaft driven unit, or the intercooler, but it should be understood that we prefer to use them with this invention. The details of the actuator for the planetary mechanism are also not shown and might be conventional or varied somewhat from the one shown in U.S. Patent 2,785,667.

With these and other modifications in mind, we wish that our invention be unrestricted except as by the appended claims.

We claim:

1. In an internal combustion engine, a frame, a plurality of cylinders thereon, each having at least two valve devices, pistons in the cylinders, a crank shaft driven by the pistons, a camshaft mechanism on the frame including two camshafts, one inside the other, for actuating separate valve devices, each camshaft being driven by the crankshaft, and means for changing the phase of the camshafts to vary the timing of at least one of the valve devices, including a planetary gear mechanism between the crankshaft and at least one of the camshafts, and power means responsive to the load on the engine for operating the planetary gear mechanism for varying the phase of the one camshaft relative to the crankshaft.

2. The structure of claim 1 further characterized in that the engine is a V engine having two rows of cylinders disposed at an angle to each other, the camshaft mechanism being disposed in the V between the cylinder rows.

3. In a reversing engine, a cylinder and piston, a valve for the cylinder, means for actuating the valve in timed relation to the cyclical operation of the engine, power means for varying the timing of the valve in relation to load variation when the engine is running in one direction, and separate power means for varying the timing of the valve in relation to load variations when the engine is running in the other direction.

4. The structure of claim 3 further characterized by and including means for energizing one power means and deenergizing the other when the engine is running in one direction and for deenergizing the said one power means and for energizing the said other when the engine is running in the other direction.

5. In a reversing engine, a frame, a cylinder and piston on the frame, at least two valve devices for the cylinder, a camshaft mechanism on the frame including two camshafts, one inside the other, for actuating separate valve devices in timed relation to the cyclical operation of the engine, power means for varying the phase of one camshaft in relation to the operation of the engine to thereby vary the timing of one valve device in relation to load variation when the engine is running in one direction, and separate power means for varying the phase of the said one camshaft in relation to the operation of the engine to thereby vary the timing of the valve in relation to load variations in the same relative direction when the engine is running in the other direction.

6. The structure of claim 5 further characterized by and including a planetary gear mechanism for the said one camshaft, both power means being connected to the planetary mechanism so that one power means will actuate it in one direction, when energized, and the other power mechanism will actuate it in the other direction, when energized, and an interlock for energizing the one power mechanism and deenergizing the other when the engine is running in one direction and vice versa when the engine is running in the other direction.

7. In a reversing engine, a frame, a cylinder, cylinder head and piston on the frame, a crankshaft driven by the pistons, at least two valve devices in the cylinder head of each cylinder, a camshaft mechanism on the frame including two camshafts, one inside the other, for actuating separate valve devices, a drive from the crankshaft to each camshaft for actuating each valve device in timed relation to the cyclical operation of the engine, a planetary gear mechanism in the drive from the crankshaft to at least one of the camshafts for changing the phase of the one camshaft relative to the crankshaft, power means for rotating the planetary gear mechanism in one direction so as to vary the timing of at least one of the valve devices in relation to load variation when the engine is running in one direction, and separate power means for rotating the planetary gear mechanism in the other direction so as to vary the timing of the valve device in relation to load variations in the same relative direction when the engine is running in the other direction.

8. The structure of claim 7 further characterized in that the planetary gear mechanism is in the drive to the camshaft that actuates the inlet valves.

9. The structure of claim 7 further characterized in that the inner camshaft actuates the inlet valves and the outer camshaft actuates the exhaust valves.

10. In a reversing internal combustion engine, a cylinder and piston, at least one valve for the cylinder, a camshaft with a plurality of cams thereon for actuating the valve in timed relation to the cyclical operation of the engine when the engine is running both ahead and astern, power means for shifting the camshaft to bring a different cam into operative association with the valve when the direction of rotation is reversed, a second power means for varying the timing of the valve when the engine is running in one direction, a third power means for varying the timing of the valve when the engine is running in the other direction, and an interlock between the power means effective to energize the second power means and to inactivate the third when the engine is running in the one direction and vice versa when the engine is running in the other direction.

11. In a reversing internal combustion engine, a cylinder and piston, at least two valve devices for the cylinder, a camshaft mechanism including two camshafts for actuating separate valve devices, with a plurality of cams on each for actuating the valve devices in timed relation to the cyclical operation of the engine when the engine is running both ahead and astern, power means for shifting both camshafts to bring different cams into operative association with the valve devices when the direction of rotation is reversed, a second power means for varying the phase of at least one camshaft to vary the timing of its valve device when the engine is running in one direction, a third power means for varying the phase of the one camshaft to vary timing of its valve device when the engine is running in the other direction, and an interlock between the power means effective to activate the second power means and to inactivate the third when the engine is running in the one direction and to inactivate the second power means and inactivate the third when the engine is running in the other direction.

12. The structure of claim 11 further characterized by and including a planetary gear mechanism for varying the phase of the one camshaft relative to the cyclical operation of the engine to vary the timing of its valve device.

13. The structure of claim 11 further characterized in that one camshaft is inside the other.

14. In a reversing internal combustion engine, a frame, a cylinder, cylinder head and piston on the frame, at least two valve devices in the cylinder head of each cylinder, the cylinders being in two longitudinal rows to define a V, a crankshaft driven by the pistons, a camshaft mechanism on the frame in the V between the rows of cylinders including two camshafts, one inside the other, for actuating separate valve devices in each cylinder head, each having a plurality of cams thereon for actuating the valve devices in timed relation to the cyclical operation of the engine when the engine is running both ahead and astern, a drive from the crankshaft to each camshaft, a planetary gear mechanism in the drive from the crankshaft to at least one of the camshafts for changing the phase of the one camshaft relative to the crankshaft, power means for shifting the camshaft mechanism to bring a different cam into operative association with the valve devices when the directional of rotation is reversed, a second power means for rotating the planetary mechanism in one direction to vary the timing of that camshaft's valve device when the engine is running in one direction, a third power means for rotating the planetary mechanism in the other direction to vary the timing of the valve device in the same relative direction when the engine is running in the other direction, and an interlock between the power means effective to energize the second power means and to deenergize the third when the engine is running in the one direction and to deenergize the second power means and to energize the third when the engine is running in the other direction.

15. The structure of claim 3 further characterized by and including an interlock for energizing the said power means and deenergizing the separate power means when the engine is running in one direction and vice versa when the engine is running in the other direction.

16. The structure of claim 3 characterized in that the engine is a V engine with a plurality of cylinders disposed in two rows defining a V, and further characterized by and including a camshaft mechanism in the V between the rows of cylinders.

17. The structure of claim 16 further characterized in that the camshaft mechanism includes two camshafts, one inside the other.

18. The structure of claim 7 further characterized by and including a second planetary gear mechanism in the drive from the crankshaft to the other camshaft, and power means for operating the second planetary gear mechanism in relation to the operation of the engine.

References Cited in the file of this patent

UNITED STATES PATENTS

| | | |
|---|---|---|
| 1,301,972 | Ricardo | Apr. 29, 1919 |
| 1,399,900 | Spado | Dec. 13, 1921 |
| 1,527,456 | Woydt et al. | Feb. 24, 1925 |
| 1,980,379 | Burnett | Nov. 13, 1934 |
| 2,304,472 | Olsson | Dec. 8, 1942 |
| 2,632,340 | Dolza et al. | Mar. 24, 1953 |